United States Patent
Klein et al.

(10) Patent No.: US 11,566,107 B2
(45) Date of Patent: Jan. 31, 2023

(54) ETHERAMINE MIXTURE CONTAINING POLYETHER DIAMINES AND METHOD OF MAKING AND USING THE SAME

(71) Applicant: Huntsman Petrochemical LLC, The Woodlands, TX (US)

(72) Inventors: Howard P. Klein, The Woodlands, TX (US); Terry L. Renken, The Woodlands, TX (US); Cheng-Kuang Li, The Woodlands, TX (US)

(73) Assignee: HUNTSMAN Petrochemical LLC, The Woodlands, TX (US)

( * ) Notice: Subject to any disclaimer, the term of this patent is extended or adjusted under 35 U.S.C. 154(b) by 0 days.

(21) Appl. No.: 16/980,485

(22) PCT Filed: Mar. 18, 2019

(86) PCT No.: PCT/US2019/022683
§ 371 (c)(1),
(2) Date: Sep. 14, 2020

(87) PCT Pub. No.: WO2019/182941
PCT Pub. Date: Sep. 26, 2019

(65) Prior Publication Data
US 2021/0017334 A1 Jan. 21, 2021

Related U.S. Application Data

(60) Provisional application No. 62/644,848, filed on Mar. 19, 2018.

(51) Int. Cl.
| | | |
|---|---|---|
| C08G 73/02 | (2006.01) |
| C08G 18/50 | (2006.01) |
| C08G 18/76 | (2006.01) |
| C08G 59/50 | (2006.01) |
| C08L 79/02 | (2006.01) |
| B01J 23/755 | (2006.01) |
| C08G 18/72 | (2006.01) |
| C08G 65/26 | (2006.01) |
| C08G 65/322 | (2006.01) |
| C08G 65/325 | (2006.01) |
| C08L 63/00 | (2006.01) |
| C09D 163/00 | (2006.01) |
| C09D 175/02 | (2006.01) |

(52) U.S. Cl.
CPC ....... C08G 73/024 (2013.01); C08G 18/5024 (2013.01); C08G 18/7671 (2013.01); C08G 59/504 (2013.01); C08L 79/02 (2013.01)

(58) Field of Classification Search
None
See application file for complete search history.

(56) References Cited

U.S. PATENT DOCUMENTS

| | | | |
|---|---|---|---|
| 5,247,078 A * | 9/1993 | Champion | C07D 273/00 540/467 |
| 2012/0283405 A1* | 11/2012 | Klein | H01L 51/0005 528/68 |
| 2013/0165620 A9 | 6/2013 | Klein et al. | |
| 2016/0257777 A1* | 9/2016 | Zhou | C08G 65/2609 |
| 2016/0257778 A1* | 9/2016 | Zhou | C08G 59/504 |

OTHER PUBLICATIONS

International Search Report received in corresponding application PCT/US2019/022683, completed Apr. 24, 2019 and dated Jun. 27, 2019.
Written Opinion received in corresponding application PCT/US2019/022683, completed Apr. 24, 2019 and dated Jun. 27, 2019.

* cited by examiner

*Primary Examiner* — Randy P Gulakowski
*Assistant Examiner* — Ha S Nguyen
(74) *Attorney, Agent, or Firm* — Huntsman Petrochemical LLC; Aleece Hayes

(57) ABSTRACT

An etheramine mixture comprising one or more polyether diamines, methods for its production, and its use as a curing agent for epoxy resins. The etheramine mixture may also be used in the preparation of polyamides and polyurea compounds.

19 Claims, No Drawings

ETHERAMINE MIXTURE CONTAINING POLYETHER DIAMINES AND METHOD OF MAKING AND USING THE SAME

CROSS-REFERENCE TO RELATED APPLICATIONS

This application is the National Phase of International Application PCT/US2019/022683 filed Mar. 18, 2019 which designated the U.S. and which claims priority to U.S. Provisional App. Ser. No. 62/644,848 filed Mar. 19, 2018. The noted applications are incorporated herein by reference.

STATEMENT REGARDING FEDERALLY SPONSORED RESEARCH OR DEVELOPMENT

Not applicable.

FIELD

The present disclosure generally relates to an etheramine mixture comprising one or more polyether diamines, methods for its production, and its use as a curing agent for epoxy resins. Epoxy resin systems containing such an etheramine mixture may be suitable for preparing, for example, self-leveling (and self-curing) floor coatings, high-build table tops, and other decorative coating applications. The etheramine mixture containing one or more polyether diamines may also be used in the preparation of polyamides and polyurea compounds.

BACKGROUND

Polyetheramines are widely used as curing agents for epoxy resins or as reactants in the synthesis of polyamides or polyureas. Such polyetheramines are generally produced by the reaction of an alkylene oxide with an alcohol to form a polyoxyalkylene polyol and then subsequent conversion of the hydroxyl groups to amine groups by reductive amination.

Despite the state of the art, there is a continuous need for the development of new polyetheramines which can be used as curing agents for curable epoxy resins, which result in different curing conditions for the epoxy resins and unique properties for the cured epoxy compositions obtained therefrom.

It is therefore an object of the present disclosure to provide an etheramine mixture comprising polyetheramines that can be used as a curing agent for epoxy resins, wherein epoxy resin systems containing such have self-curing capabilities at room temperature and, once cured, good flexibility for use in applications such as, for example but without limitation, floor coatings, high-build table tops, and other decorative coating applications. It is another object of the present disclosure to provide a method of producing such an etheramine mixture.

DETAILED DESCRIPTION

Before explaining at least one embodiment of the present disclosure in detail, it is to be understood that the present disclosure is not limited in its application to the details of construction and the arrangement of components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y. Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the term "and combinations thereof" when used with the phrase "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt. %", "weight percent", or "percentage by weight" are used interchangeably.

As used herein, the phrase "room temperature" refers to the ambient temperature of the surrounding work environment (e.g., the temperature of the area, building or room where the curable composition is used), exclusive of any temperature changes that occur as a result of the direct application of heat to the curable composition to facilitate curing. Room temperature is typically between about 5° C. to about 30° C., or between about 10° C. and about 30° C., or more specifically about 15° C. and about 25° C., and or even more specifically about 20° C. to about 25° C.

According to one aspect, the present disclosure is directed to an etheramine mixture comprising one or more polyether diamines of formula (I):

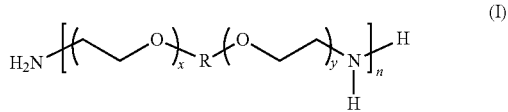

(I)

wherein: R is a radical of a hydrophobic diol after removal of the two hydroxyl groups from the hydrophobic diol; n is in a range of from 1 to 3; x and y are each in a range of from 1 to 9; and the sum of x and y is in a range of from 2 to 10. In another embodiment, x and y are each in a range of from 0 to 9 with the caveat that if one of x or y is 0, then the other is in a range of from 1 to 9, and the sum of x and y is in a range of from 1 to 10.

The hydrophobic diol can be selected from a cycloaliphatic diol, a hydrogenated aromatic diol, a linear alkyl diol, and combinations thereof.

In one embodiment, the hydrophobic diol comprises 6 to 15 carbon atoms. In another embodiment, the hydrophobic diol comprises 6 to 12 carbon atoms. In yet another embodiment, the hydrophobic diol comprises 6 to 10 carbon atoms.

Non-limiting examples of the cycloaliphatic diol include cyclopentane diols and cyclohexane diols, such as, for example but without limitation, 1,3-cyclopentanediol, 1,2-cyclohexanediol, 1,3-cyclohexanediol, 1,3-cyclohexanedimethanol, 1,4-cyclohexanediol, 1,4-cyclohexanedimethanol, 1,5-cyclooctanediol, hydrogenated derivatives of: bisphenol F, bisphenol A, hydroquinone, catechol, and resorcinol, and combinations thereof. One particularly preferred cyclohexane diol is 1,4-cyclohexanedimethanol (CHDM).

Non-limiting example of the linear alkyl diol include 1,6-hexanediol, 1,7-heptane diol, 1,8-octanediol, 1,9-nonanediol, and 1,10-decanediol. One particularly preferred linear alkyl diol is 1,8-octanediol.

In another embodiment, the hydrophobic diol can be neopentyl glycol.

The sum of x and y can be in a range of from 1 to 9, or from 1 to 8, or from 2 to 8, or from 2 to 7, or from 3 to 7, or from 3 to 6, or from 4 to 5, or about 4.5. In another embodiment, n is in a range of from 1 to 2.

In a particularly preferred embodiment, "R" in formula (I) is a radical of the hydrophobic diol 1,4-cyclohexanedimethanol after removal of the two hydroxyl groups, as represented by formula (II):

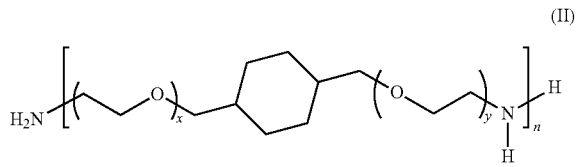

(II)

wherein x, y, and n are the same as those previously defined for formula (I).

In one embodiment, the amine groups of the one or more polyether diamines of formula (I) are at least 60%, or at least 65%, or at least 70%, or at least 75% primary amines. In one particular embodiment, about 75 to 80% of the amine groups of the one or more polyether diamines of formula (I) are primary amines.

In another embodiment, the etheramine mixture comprises less than 10 wt. % of a monoether diamine based on the total weight of the etheramine mixture.

In yet another embodiment, the etheramine mixture can comprise one or more polyether diamines of formula (III):

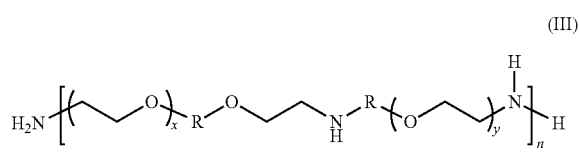

(III)

wherein: R is a radical of a hydrophobic diol (as described above) after removal of the two hydroxyl groups from the hydrophobic diol; n is in a range of from 1 to 3; x and y are each in a range of from 1 to 9; and the sum of x and y is in a range of from 2 to 10. In an alternative embodiment, x and y are each in a range of from 0 to 9 with the caveat that if one of x or y is 0, then the other is in a range of from 1 to 9, and the sum of x and y is in a range of from 1 to 10.

The present disclosure is also directed to a method for producing an etheramine mixture comprising: (i) charging a hydrophobic diol (as described above) to an alkoxylation reaction zone; (ii) contacting the hydrophobic diol with an ethylene oxide in the alkoxylation reaction zone to provide a precursor diol, wherein the molar ratio of ethylene oxide to the hydrophobic diol is in a range of from about 1:1 to about 10:1, or from about 2:1 to about 10:1, or from about 2:1 to about 9:1, or from about 2:1 to about 8:1, or from about 2:1 to about 7:1, or from about 2:1 to about 6:1, or from about 3:1 to about 6:1, or from about 3:1 to about 5:1, or from about 4:1 to about 5:1, or about 4.5:1; and (iii) charging the precursor diol to a reductive amination zone and reductively aminating the precursor diol to form the etheramine mixture containing one or more polyether diamines of formula (I).

The amount of time the hydrophobic diol is contacted with the alkylene oxide is such that it is sufficient to form the precursor diol and in some embodiments may range from about 0.5 hours to about 24 hours.

The alkoxylation reaction zone can be a closed reaction vessel, wherein alkoxylation is carried out under elevated temperature and pressure and in the presence of a base catalyst. Thus, alkoxylation may be conducted at a temperature ranging from about 50° C. to about 150° C. and a pressure ranging from about 40 psi to about 100 psi. The base catalyst may be any alkaline compound customarily used for base-catalyzed reactions, for example, an alkali metal hydroxide such as sodium hydroxide, lithium hydroxide, potassium hydroxide, or cesium hydroxide, or a tertiary amine, such as dimethyl cyclohexylamine or 1,1,3,3-tetramethylguanidine. After alkoxylation, the resulting mixture may be vacuum stripped to remove any unnecessary components, such as excess unreacted alkylene oxide, water and/or base catalyst, while leaving the resulting precursor diol.

In some embodiments, prior to reductive amination, the precursor diol may be neutralized with any suitable acid or chemical adsorbent, such as for example, oxalic acid or magnesium silicate, and filtered for the removal of insoluble materials.

In one particular embodiment, the step of reductively aminating the precursor diol is carried out in the presence of a reductive amination catalyst, hydrogen, and ammonia. More particularly, the step of reductively aminating the precursor diol includes charging the precursor diol to a reductive amination zone where it is brought into contact with a reductive amination catalyst, sometimes referred to as a hydrogenation-dehydrogenation catalyst, and reductively aminated in the presence of ammonia and hydrogen under reductive amination conditions. Such reductive amination conditions may include, for example, a temperature within the range of about 150° C. to about 275° C. and a pressure within the range of about 500 to about 5000 psi with temperatures within the range of about 180° C. to about 220° C. and pressures within the range of about 1500 to about 2500 psi being preferred.

Any suitable hydrogenation catalyst may be used for the reductive amination step, such as those described in U.S. Pat. No. 3,654,370, the contents of which are incorporated herein by reference. In some embodiments, the hydrogenation catalyst may comprise one or more of the metals of group VIIIB of the Periodic Table, such as iron, cobalt, nickel, ruthenium, rhodium, palladium, platinum, mixed with one or more metals of group VIB of the Periodic Table such as chromium, molybdenum or tungsten. A promoter from group IB of the Periodic Table, such as copper, may also be included. As an example, a catalyst may be used comprising from about 60 mole percent to about 85 mole percent of nickel, about 14 mole percent to about 37 mole percent of copper and about 1 mole percent to about 5 mole percent of chromium (as chromia), such as a catalyst of the type disclosed in U.S. Pat. No. 3,152,998. As another example, a catalyst of the type disclosed in U.S. Pat. No. 4,014,933 may be used containing from about 70% by weight to about 95% by weight of a mixture of cobalt and nickel and from about 5% by weight to about 30% by weight of iron. As another example, a catalyst of the type disclosed in U.S. Pat. No. 4,152,353 may be used, comprising nickel, copper and a third component which may be iron, zinc, zirconium or a mixture thereof, for example, a catalyst containing from about 20% by weight to about 49% by weight of nickel, about 36% by weight to about 79% by weight of copper and about 1% by weight to about 15% by weight of iron, zinc, zirconium or a mixture thereof. As still another example, a catalyst of the type described in U.S. Pat. No. 4,766,245 may be used comprising about 60% by weight to about 75% by weight of nickel and about 25% by weight to about 40% by weight of aluminum.

The reductive amination is preferably conducted on a continuous basis with the precursor diol, ammonia and hydrogen being continuously charged to a reactor containing a fixed bed of reductive amination catalyst and with the reaction product being continually withdrawn.

The reaction product is suitably depressured so as to recover excess hydrogen and ammonia for recycle and is then fractionated to remove byproduct water of reaction and to provide the desired etheramine mixture.

In conducting the reductive amination, the reductive amination conditions to be utilized may suitably include the use of from about 4 moles to about 150 moles of ammonia per hydroxyl equivalent of precursor diol feedstock. Hydrogen is preferably used in an amount ranging from about 0.5 mole equivalents to about 10 mole equivalents of hydrogen per hydroxyl equivalent of precursor diol feedstock. The contact times within the reaction zone, when the reaction is conducted on a batch basis, may suitably be within the range of from about 0.1 hours to about 6 hours and more preferably from about 0.15 hours to about 2 hours.

When the reaction is conducted on a continuous basis using catalyst pellets, reaction rates may suitably be from about 0.1 grams to about 2 grams of feedstock per hour per cubic centimeter of catalyst and, more preferably, from about 0.3 grams to about 1.6 grams of feedstock per hour per cubic centimeter of catalyst.

Also, the reductive amination may be conducted in the presence of about 1 mole to about 200 moles of ammonia per mole of precursor diol and more preferably, from about 4 moles to about 130 moles of ammonia per mole of precursor diol. From about 0.1 moles to about 50 moles of hydrogen per mole of precursor diol may be employed and, more preferably, from about 1 mole to about 25 moles of hydrogen per mole of precursor diol.

In another aspect, the present disclosure is directed to the etheramine mixture produced according to the method as presently disclosed.

Due to its favorable properties, the etheramine mixture according to the present disclosure may be used as a curing agent for epoxy resins or as a reactant in the preparation of polyamides and polyurea compounds, which can be utilized in a variety of industrial applications, including the preparation of, for example, self-leveling (and self-curing) floor coatings, high-build table tops, and other decorative coating applications.

In yet another aspect, the present disclosure is directed to an epoxy resin system comprising an epoxy resin and the etheramine mixture as disclosed herein. The present disclosure is also directed to a method of forming an epoxy resin system comprising contacting an epoxy resin with the presently disclosed etheramine mixture.

The epoxy resin may be any one or mixture of reactive epoxy resin(s) having a 1,2-epoxy equivalency (functionality), on the average, of at least 1 epoxide groups per molecule, preferably at least 1.3 epoxide groups per molecule, and more preferably at least 1.6 epoxide groups per molecule, and even more preferably with epoxy resins having a functionality of at least 2 epoxy groups per molecule such that the mixture will polymerize to form a useful material with the polyether diamines of the presently disclosed etheramine mixture or its blend with other amine hardeners. In another embodiment, the epoxy resin has a functionality on the average ranging from at least 1.3 epoxide groups per molecule to about 8 epoxide groups per molecule, preferably from at least about 1.6 epoxide groups per molecule to about 5 epoxide groups per molecule. The epoxy resin can be saturated or unsaturated, linear or branched, aliphatic, cycloaliphatic, aromatic or heterocyclic, and may bear substituents such as bromine or fluorine. It may be monomeric or polymeric, liquid or solid, but is preferably liquid or a low melting solid at room temperature.

According to one embodiment, the epoxy resin is a polyglycidyl epoxy compound, such as a polyglycidyl ether, poly(β-methylglycidyl) ether, polyglycidyl ester or poly(β-methylglycidyl) ester. The synthesis and examples of polyglycidyl ethers, poly(β-methylglycidyl) ethers, polyglycidyl esters and poly(β-methylglycidyl) esters are disclosed in U.S. Pat. No. 5,972,563, which is incorporated herein by reference. For example, ethers may be obtained by reacting a compound having at least one free alcoholic hydroxyl group and/or phenolic hydroxyl group with a suitably substituted epichlorohydrin under alkaline conditions or in the presence of an acidic catalyst followed by alkali treatment. The alcohols may be, for example, acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol and sorbitol. Suitable glycidyl ethers may also be obtained, however, from cycloaliphatic alcohols, such as 1,3- or 1,4-dihydroxycyclohexane, bis(4-hydroxycyclo-hexyl)methane, 2,2-bis(4-hydroxycyclohexyl)propane or 1,1-bis(hydroxymethyl)cyclohex-3-ene, or they may possess aromatic rings, such as N,N-bis(2-hydroxyethyl)aniline or p,p'-bis(2-hydroxyethylamino)diphenylmethane.

Representative examples of polyglycidyl ethers or poly(β-methylglycidyl) ethers include those based on monocyclic phenols, for example, on resorcinol or hydroquinone, on polycyclic phenols, for example, on bis(4-hydroxyphenyl)methane (Bisphenol F), 2,2-bis(4-hydroxyphenyl)propane (Bisphenol A), bis(4-hydroxyphenyl)S (Bisphenol S), alkoxylated Bisphenol A, F or S, triol extended Bisphenol A, F or S and brominated Bisphenols A, F or S, hydrogenated Bisphenol A, F or S, glycidyl ethers of phenols and phenols with pendant groups or chains, on condensation products, obtained under acidic conditions, of phenols or cresols with formaldehyde, such as phenol novolaks and cresol novolaks, or on siloxane diglycidyls.

Polyglycidyl esters and poly(β-methylglycidyl) esters may be produced by reacting epichlorohydrin or glycerol dichlorohydrin or β-methylepichlorohydrin with a polycarboxylic acid compound. The reaction is expediently carried out in the presence of bases. The polycarboxylic acid compounds may be, for example, glutaric acid, adipic acid, pimelic acid, suberic acid, azelaic acid, sebacic acid or dimerized or trimerized linoleic acid. Likewise, however, it is also possible to employ cycloaliphatic polycarboxylic acids, for example tetrahydrophthalic acid, 4-methyltetrahydrophthalic acid, hexahydrophthalic acid or 4-methylhexahydrophthalic acid. It is also possible to use aromatic polycarboxylic acids such as, for example, phthalic acid, isophthalic acid, trimellitic acid or pyromellitic acid, or else carboxyl-terminated adducts, for example of trimellitic acid and polyols, for example glycerol or 2,2-bis(4-hydroxycyclohexyl)propane, can be used.

In another embodiment, the epoxy resin is a non-glycidyl epoxy compound. Non-glycidyl epoxy compounds may be linear, branched, or cyclic in structure. For example, there may be included one or more epoxide compounds in which the epoxide groups form part of an alicyclic or heterocyclic ring system. Others include an epoxy-containing compound with at least one epoxycyclohexyl group that is bonded directly or indirectly to a group containing at least one silicon atom. Examples are disclosed in U.S. Pat. No. 5,639,413, which is incorporated herein by reference. Still others include epoxides which contain one or more cyclohexene oxide groups and epoxides which contain one or more cyclopentene oxide groups. Particularly suitable non-glycidyl epoxy compound's include the following difunctional non-glycidyl epoxide compounds in which the epoxide groups form part of an alicyclic or heterocyclic ring system: bis(2,3-epoxycyclopentyl) ether, 1,2-bis(2,3-epoxycyclopentyloxy)ethane, 3,4-epoxycyclohexyl-methyl 3,4-epoxycyclohexanecarboxylate, 3,4-epoxy-6-methyl-cyclohexylmethyl 3,4-epoxy-6-methylcyclohexanecarboxylate, di(3,4-epoxycyclohexylmethyl)hexanedioate, di(3,4-epoxy-6-methylcyclohexylmethyl) hexanedioate, ethylenebis(3,4-epoxycyclohexanecarboxylate), ethanediol di(3,4-epoxycyclohexylmethyl)ether, vinylcyclohexene dioxide, dicyclopentadiene diepoxide or 2-(3,4-epoxycyclohexyl-5,5-spiro-3,4-epoxy)cyclohexane-1,3-dioxane, and 2,2'-bis-(3,4-epoxy-cyclohexyl)-propane.

In another embodiment, the epoxy resin is an epoxy novolac compound obtained by the reaction of, preferably in the presence of a basic catalyst such as sodium or potassium hydroxide, an epihalohydrin, such as epichlorohydrin, with a resinous condensate of an aldehyde, such as formaldehyde and either a monohydric phenol or polyhydric phenol.

In other embodiments, the epoxy resin is a poly(N-glycidyl) compound or poly(S-glycidyl) compound. Poly(N-glycidyl) compounds are obtainable, for example, by dehydrochlorination of the reaction products of epichlorohydrin with amines containing at least two amine hydrogen atoms. These amines may be, for example, n-butylamine, aniline, toluidine, m-xylylenediamine, bis(4-aminophenyl)methane or bis(4-methylaminophenyl)methane. Other examples of poly(N-glycidyl) compounds include N,N'-diglycidyl derivatives of cycloalkyleneureas, such as ethyleneurea or 1,3-propyleneurea, and N,N'-diglycidyl derivatives of hydantoins, such as of 5,5-dimethylhydantoin. Examples of poly(S-glycidyl) compounds are di-S-glycidyl derivatives derived from dithiols, for example ethane-1,2-dithiol or bis(4-mercaptomethylphenyl) ether.

It is also possible to employ epoxy-containing compounds in which the 1,2-epoxide groups are attached to different heteroatoms or functional groups. Examples of these compounds include the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

Other epoxide derivatives may be employed, such as vinyl cyclohexene dioxide, limonene dioxide, limonene monoxide, vinyl cyclohexene monoxide, 3,4-epoxycyclohexlmethyl acrylate, 3,4-epoxy-6-methyl cyclohexylmethyl 9,10-epoxystearate, and 1,2-bis(2,3-epoxy-2-methyl-propoxy)ethane. Also conceivable is the use of oxetanes or liquid pre-reacted adducts of epoxy-containing compounds, such as those mentioned above, with hardeners for the epoxy resins.

The epoxy resin system may further contain customary additives and auxiliaries such as stabilizers, modifiers, antifoaming agents, toughening agents, accelerators, co-curing agents, leveling agents, thickening agents, flame retardants, antioxidants, pigments, dyes, fillers, and combinations thereof. For example, an accelerator such as guanidine or a derivative thereof may be used in the epoxy resin system. Examples of guanidine derivatives include without limitation, an alkylguanidine such as dimethylguanidine or tetramethyl guanidine, or a guanidinium salt derived from any of these. Examples of guanidinium salts include without limitation, guanidine carbonates, guanidine acetates, and guanidine nitrates. One skilled in the art with the benefit of this disclosure will recognize appropriate additives and auxiliaries for use in embodiments of the present disclosure.

In some embodiments of the present disclosure, the etheramine mixtures may not require the use of co-curing agent, such as cycloaliphatic diamines such as isophorone diamine. In these embodiments, fewer materials would be needed to manufacture the epoxy resin as well as less energy needed to reach the lower cure temperature.

Once prepared, the epoxy resin system may be applied to one or more surfaces of an article, for example, brushing, spraying, dipping, electrostatic spraying, etc., the epoxy resin system thereto, and then subjecting the coated article to conditions suitable to cause the epoxy resin system to cure.

The above-described epoxy resin system, once prepared and/or applied to one or more surfaces, may then be subjected to conditions sufficient to cause the epoxy resin system to cure.

In one embodiment, the epoxy resin system is substantially cured at room temperature. It was surprisingly found that the presently disclosed etheramine mixture has low viscosity and epoxy resin systems containing such are capable of being substantially cured at room temperature within about 12 hours without additional heating. In one particular embodiment, the epoxy resin system is substantially cured at a temperature ranging from about 20° C. to about 30° C. for a time ranging from about 6 to about 24 hours, or from about 6 to about 22 hours, or from about 6 to about 20 hours, or from about 12 to about 24 hours, or from about 16 to about 22 hours, or from about 6 to 12 hours, or any span of time between the ranges set forth herein.

In alternative embodiments, the epoxy resin system is cured at an elevated temperature, for example, at a temperature within the range from about 40° C. to about 220° C. In some embodiments, the cure time may be from about 2 hours to about 24 hours, including any individual amount of time therebetween.

The present disclosure, in one aspect, is directed to a composite formed by curing the epoxy resin system as disclosed herein.

In one particular embodiment, the epoxy resin system is substantially free of methyl 3-methoxypropionate ("MMP") and/or benzyl alcohol.

The present disclosure is further directed to a method of producing a polyurea comprising reacting an organic polyisocyanate with the presently disclosed etheramine mixture. The present disclosure is also directed to a polyurea formed by reacting an organic polyisocyanates with the presently disclosed etheramine mixture.

The organic polyisocyanates include, for example but without limitation, standard isocyanate compounds and compositions known to those having ordinary skill in the art. Non-limiting examples of such organic polyisocyanates include MDI-based quasi prepolymers such as those commercially available as RUBINATE® 9480, RUBINATE® 9484, and RUBINATE® 9495 brand products which are all available from Huntsman Corporation or an affiliate thereof (The Woodlands, Tex.). Liquefied MDI such as MONDUR® ML isocyanate, available from Bayer MaterialScience, may also be used as all or part of the isocyanate.

Other organic polyisocyanates which can be employed include those generally known to one skilled in the art. Thus, for instance, they can include aliphatic isocyanates of the type described in U.S. Pat. No. 4,748,192, which is hereby fully incorporated herein by reference. Accordingly, they are typically aliphatic diisocyanates and, more particularly, are the trimerized or the biuretic form of an aliphatic diisocyanate, such as hexamethylene diisocyanate, or the bifunctional monomer of the tetraalkyl xylene diisocyanate, such as the tetramethyl xylene diisocyanate. Another example of an aliphatic isocyanate is cyclohexane diisocyanate. Other useful aliphatic isocyanates are described in U.S. Pat. No. 4,705,814 which is fully incorporated herein by reference. They include aliphatic diisocyanates, for example, alkylene diisocyanates with 4 to 12 carbon atoms in the alkylene radical, such as 1,12-dodecane diisocyanate and 1,4-tetramethylene diisocyanate. Also described are cycloaliphatic diisocyanates, such as 1,3 and 1,4-cyclohexane diisocyanate as well as any desired mixture of these isomers, 1-isocyanato-3,3,5-trimethyl-5-isocyanato methylcyclohexane (isophorone diisocyanate); 4,4'-, 2,2'- and 2,4'-dicyclohexylmethane diisocyanate as well as the corresponding isomer mixtures, and the like.

A wide variety of aromatic polyisocyanates may also be used to form the polyurea of the present disclosure. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)

methane, bis(3-methyl-3-iso-cyanatophenyl)methane, bis(3-methyl-4-isocyanatophenyl)methane, and 4,4'-diphenylpropane diisocyanate. Other aromatic polyisocyanates which may be used are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979, all of which are fully incorporated herein by reference. Usually, methylene-bridged polyphenyl polyisocyanate mixtures contain about 20 to about 100 weight percent methylene diphenyl diisocyanate isomers, with the remainder being polymethylene polyphenyl diisocyanates having higher functionalities and higher molecular weights. Typical of these are polyphenyl polyisocyanate mixtures containing about 20 to about 100 weight percent diphenyl diisocyanate isomers, of which about 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979. A preferred aromatic polyisocyanate is methylene bis (4-phenylisocyanate) or "MDI". Pure MDI, quasi-prepolymers of MDI, modified pure MDI, etc. are useful to prepare a polyurea according to the present disclosure. Since pure MDI is a solid and, thus, often inconvenient to use, liquid products based on MDI or methylene bis(4-phenylisocyanate) are used herein. U.S. Pat. No. 3,394,164, incorporated herein by reference, describes a liquid MI product. More generally, uretonimine modified pure MDI is included also. This product is made by heating pure distilled MDI in the presence of a catalyst. The liquid product is a mixture of pure MDI and modified MDI. The term organic polyisocyanate also includes quasi-prepolymers of isocyanates or polyisocyanates with active hydrogen containing materials.

EXAMPLES

Examples are provided below. However, the present disclosure is to be understood to not be limited in its application to the specific experiments, results, and laboratory procedures disclosed herein below. Rather, the Examples are simply provided as one of various embodiments and are meant to be exemplary and not exhaustive.

Etheramine Mixture

An exemplary etheramine mixture was prepared by adding about 3.27 kg (7.2 lbs.) of 1,4-cyclohexanedimethanol (CHDM) and 100 g of dimethyl cyclohexylamine (DMCHA) to a four-gallon reactor kettle. The mixture of CHDM and DMCHA was heated under nitrogen to 90° C., and then 3.99 kg (8.8 lbs.) of ethylene oxide ("EO") was slowly added to the reactor at 90-100° C. at a maximum pressure of 40 psig. The mixture of CHDM, DMCHA, and EO was then digested at 100° C. for 2 to 3 hours to form a digested mixture containing a polyetherdiol from the reaction of CHDM and EO. After digestion, the digested mixture was stripped with nitrogen and then subjected to a vacuum at 100° C. to remove excess EO and DMCHA. The remaining polyetherdiol was packaged in a one-gallon jug. The polyetherdiol was a clear, mobile liquid with a hydroxyl number of 363, water content of 0.07 wt. %, and a weight average molecular weight of 309 Daltons.

The polyetherdiol from the reaction of CHDM and EO was then subjected to continuous, reductive amination over a nickel/copper/zirconia catalyst in an up-flow reactor, with hydrogen and ammonia, at a temperature of about 200° C. and pressure of about 2000 psi for about 24 to 36 hours to form the etheramine mixture comprising one or more polyether diamines. The ethylene mixture was collected in gallon containers, which were vented of excess ammonia and vacuum stripped down to about 1-2 mmHg to remove water and residual ammonia. The final ethylene mixture was a very low-colored liquid with low viscosity and showed complete solubility in water.

Further analysis showed that the etheramine mixture had a total amine value of 5.17 meq./g. and an amine conversion of 96.4%, 78.5% of which was primary amines and 21.5% of mostly secondary amines. The weight average molecular weight of the etheramine mixture was about 650 Daltons and the calculated amine hydrogen equivalent weight (AHEW) was 109.

The above-described example sets forth a molar ratio of 4:1 of EO to CHDM. The same process as described was used for two additional examples but at molar ratios of EO to CHDM of 2:1 and 3.33:1.

Various properties of the three examples are set forth in Table 1 below. The three examples are differentiated by the molar ratios of EO to CHDM.

TABLE 1

| Molar Ratio of EO:CHDM | 2:1 | 3.33:1 | 4:1 |
|---|---|---|---|
| AHEW | 80 | 101 | 109 |
| Primary Amine, % | 76 | 75 | 77 |
| Secondary Amine, % | 23 | 25 | 22 |
| Viscosity, cps @ 25° C. | 150 | 195 | 162 |

Cured Epoxy Resin System

A curable epoxy resin system was prepared by adding (i) 59 g of the above-described etheramine mixture prepared using a 4:1 molar ratio of EO to CHDM, and (ii) 100 g of ARALDITE® 6010 epoxy resin available from Huntsman Corporation or one of its affiliates (The Woodlands, Tex.). The resulting mixture was stirred well with a spatula until a clear, homogeneous solution was formed. The homogeneous solution was then poured into molds as well as over a wooden surface with an attached picture. After curing overnight at room temperature, both the castings and wood coating were clear, hard materials, which were glossy on the surface without any apparent defects such as amine-blush or water-spotting.

From the above description, it is clear that the present disclosure is well adapted to carry out the object and to attain the advantages mentioned herein as well as those inherent in the present disclosure. While exemplary embodiments of the present disclosure have been described for the purposes of the disclosure, it will be understood that numerous changes may be made which will readily suggest themselves to those skilled in the art which can be accomplished without departing from the scope of the present disclosure and the appended claims.

What is claimed is:

1. An etheramine mixture comprising:
one or more polyether diamines of formula (I):

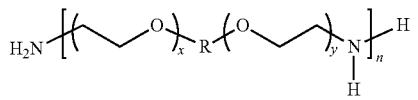

wherein: R is a radical of a hydrophobic diol after removal of the two hydroxyl groups from the hydrophobic diol; n is in a range of from 1 to 3; x and y are each in a range of from 0 to 9 with the caveat that if one of x or y is 0, then the other is in a range of from 1 to 9; and the sum of x and y is in a range of from 1 to 10;
at least one or more polyether diamines of formula (III):

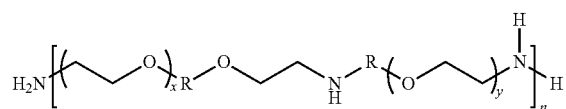

wherein: R is a radical of a hydrophobic diol after removal of the two hydroxyl groups from the hydrophobic diol; n is in a range of from 1 to 3; x and y are each in a range of from 1 to 9; and the sum of x and y is in a range of from 2 to 10; and
less than 10 wt. % of a monoether diamine based on the total weight of the etheramine mixture.

2. The etheramine mixture of claim 1, wherein x and y are each in a range of from 1 to 9 and the sum of x and y is in a range of from 2 to 10 for each of the one or more polyether diamines of formula (I) and formula (III).

3. The etheramine mixture of claim 1, wherein the hydrophobic diol has 6 to 15 carbon atoms for each of the one or more polyether diamines of formula (I) and formula (III).

4. The etheramine mixture of claim 3, wherein the hydrophobic diol is selected from a cycloaliphatic diol, a hydrogenated aromatic diol, a linear alkyl diol, or a combination thereof.

5. The etheramine mixture of claim 3, wherein the hydrophobic diol is a cyclopentane diol or a cyclohexane diol.

6. The etheramine mixture of claim 1, wherein the sum of x and y is in a range of from 3 to 6 for each of the one or more polyether diamines of formula (I) and formula (III).

7. The etheramine mixture of claim 1, wherein at least 60% of the amine groups of the one or more polyether diamines of formula (I) are primary amines.

8. A method for producing an etheramine mixture, comprising:
charging a hydrophobic diol to an alkoxylation reaction zone;
contacting the hydrophobic diol with an ethylene oxide in the alkoxylation reaction zone to provide a precursor diol, wherein the ratio of moles of ethylene oxide to hydrophobic diol is in a range of from greater than 2:1 to 10:1; and
charging the precursor diol to a reductive amination zone and reductively aminating the precursor diol to form an etheramine mixture containing one or more polyether diamines of formula (I):

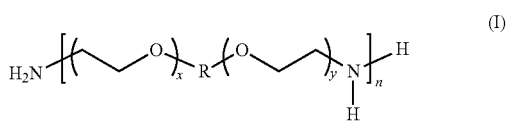

wherein: R is a radical of a hydrophobic diol after removal of the two hydroxyl groups from the hydrophobic diol; n is in a range of from 1 to 3; x and y are each in a range of from 0 to 9 with the caveat that if one of x or y is 0, then the other is in a range of from 1 to 9; and the sum of x and y is in a range of from 1 to 10; one or more polyether diamines of the formula (III)

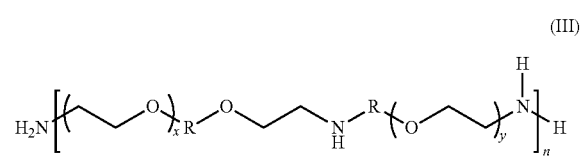

wherein: R is a radical of a hydrophobic diol after removal of the two hydroxyl groups from the hydrophobic diol; n is in a range of from 1 to 3; x and y are each in a range of from 1 to 9; and the sum of x and y is in a range of from 2 to 10; and
less than 10 wt. % of monoether diamine based on the total weight of the etheramine mixture.

9. The method of claim 8, wherein x and y are each in a range of from 1 to 9 and the sum of x and y is in a range of from 2 to 10 for each of the one or more polyether diamines of formula (I) and formula (III).

10. The method of claim 8, wherein the hydrophobic diol has 6 to 15 carbon atoms for each of the one or more polyether diamines of formula (I) and formula (III).

11. The method of claim 10, wherein the hydrophobic diol is selected from a cycloaliphatic diol, a hydrogenated aromatic diol, a linear alkyl diol, or a combination thereof.

12. A method for producing an epoxy resin system, comprising:
providing the etheramine mixture of claim 1;
providing an epoxy resin;
contacting the etheramine mixture and the epoxy resin to form an epoxy resin system.

13. A method for producing a cured epoxy resin system, comprising:
providing an etheramine mixture of claim 1;
providing an epoxy resin;
contacting the etheramine mixture and the epoxy resin to form an epoxy resin system; and
curing the epoxy resin system.

14. The method of claim 13, wherein the step of curing the epoxy resin system comprises subjecting the epoxy resin system to a temperature ranging from about 5° C. to 30° C. for a time ranging from 6 to 24 hours.

15. A method for producing a polyurea comprising reacting the etheramine mixture of claim 1 with an organic polyisocyanate.

16. A polyurea produced by the method of claim 15.

17. An etheramine mixture produced by a method comprising the steps of:
charging a hydrophobic diol to an alkoxylation reaction zone;
contacting the hydrophobic diol with an ethylene oxide in the alkoxylation reaction zone to provide a precursor diol, wherein the ratio of moles of ethylene oxide to hydrophobic diol is in a range of from greater than 2:1 to 10:1; and charging the precursor diol to a reductive amination zone and reductively aminating the precursor diol to form the etheramine mixture containing one or more polyether diamines of formula (I):

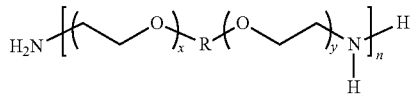 (I)

wherein: R is a radical of a hydrophobic diol after removal of the two hydroxyl groups from the hydrophobic diol; n is in a range of from 1 to 3; x and y are each in a range of from 0 to 9 with the caveat that if one of x or y is 0, then the other is in a range from 1 to 9; and the sum of x and y is in a range of from 1 to 10; one or more polyether diamines of the formula (III)

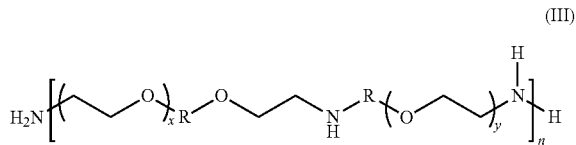 (III)

wherein: R is a radical of a hydrophobic diol after removal of the two hydroxyl groups from the hydrophobic diol; n is in a range of from 1 to 3; x and y are each in a range of from 1 to 9; and the sum of x and y is in a range of from 2 to 10; and less than 10 wt. % of monoether diamine based on the total weight of the etheramine mixture.

18. The mixture of claim 17, wherein x and y are each in a range of from 1 to 9 and the sum of x and y is in a range of from 2 to 10 for each of the one or more polyether diamines of formula (I) and (formula (III).

19. A composite formed by the method of claim 13.

* * * * *